United States Patent
Weber et al.

(10) Patent No.: US 9,752,349 B2
(45) Date of Patent: Sep. 5, 2017

(54) HANDLE FOR AN APPLIANCE OR FURNITURE WITH A HANDLE BAR AND ONE OR TWO ROTATIONAL DEVICES

(71) Applicants: MIELE & CIE. KG, Guetersloh (DE); GRONBACH VERTRIEBS GMBH, Wasserburg am Inn (DE)

(72) Inventors: Franz Josef Weber, Schnaitsee (DE); Konrad Geidobler, Vogtareuth (DE); Ulrich Feldkamp, Edling (DE)

(73) Assignees: MIELE & CIE. KG, Guetersloh (DE); GROMBACH VERTRIEBS GMBH, Wasserburg am Inn (DE)

( * ) Notice: Subject to any disclaimer, the term of this patent is extended or adjusted under 35 U.S.C. 154(b) by 0 days.

(21) Appl. No.: 14/656,738

(22) Filed: Mar. 13, 2015

(65) Prior Publication Data

US 2015/0308492 A1    Oct. 29, 2015

(30) Foreign Application Priority Data

Mar. 14, 2014    (DE) .......................... 10 2014 003 663

(51) Int. Cl.
*E05B 7/00* (2006.01)
*A47B 95/02* (2006.01)
(Continued)

(52) U.S. Cl.
CPC ................ *E05B 7/00* (2013.01); *A47B 95/02* (2013.01); *F16C 11/12* (2013.01);
(Continued)

(58) Field of Classification Search
CPC ................ E05B 7/00; A47B 2095/022; A47B 2095/023; F24C 15/024; Y10T 16/458; Y10T 16/462; Y10T 16/464; Y10T 16/4644; Y10T 16/4652; Y10T 16/498; Y10T 16/499; Y10T 16/50; Y10T 16/53848; Y10T 16/53845; Y10T 16/53888; Y10T 16/54035; Y10T 16/54038; Y10T 16/5406; Y10T 16/544;
(Continued)

(56) References Cited

U.S. PATENT DOCUMENTS 3,263,365 A * 8/1966 Eckel ..................... E05F 1/1223
16/314
3,562,849 A * 2/1971 Brayshaw .............. A47B 95/02
16/445
(Continued)

FOREIGN PATENT DOCUMENTS

DE    19948579 A1    5/2001
DE    10351980 A1    5/2004
(Continued)

*Primary Examiner* — Jeffrey O Brien
(74) *Attorney, Agent, or Firm* — Leydig, Voit & Mayer, Ltd.

(57) ABSTRACT

A handle for an appliance or furniture includes a movable handle bar and one or two rotational devices. The handle bar is attached to the housing or to one or more housings of the one or two rotational devices. A shaft of the one or two rotational devices is rotatably supported in the housing. A slide is movably and non-rotatably supported in the housing, and the slide is loaded by a spring and has a guide slot in which a guide pin of the shaft engages.

12 Claims, 19 Drawing Sheets

(51) Int. Cl.
    *F16C 11/12*     (2006.01)
    *F24C 15/02*     (2006.01)

(52) U.S. Cl.
    CPC ..... *A47B 2095/022* (2013.01); *F16C 2314/70* (2013.01); *F24C 15/024* (2013.01); *Y10T 16/458* (2015.01)

(58) Field of Classification Search
    CPC .. Y10T 16/5443; Y10T 16/53996; E05F 1/06; E05F 1/061; E05F 1/063; E05F 1/065; E05F 1/066; E05F 3/10; E05F 1/1223; E05F 3/04; E05F 3/104
    USPC .......................................... 16/348, 357, 316
    See application file for complete search history.

(56) References Cited

U.S. PATENT DOCUMENTS

| | | | | |
|---|---|---|---|---|
| 3,858,274 A | * | 1/1975 | Burton | E05F 1/061 16/312 |
| 4,215,449 A | * | 8/1980 | Loikitz | E05F 1/063 16/303 |
| 4,692,963 A | * | 9/1987 | Barroero | E05F 1/1223 16/275 |
| 4,697,302 A | * | 10/1987 | Yuenian | E05F 1/1223 16/52 |
| 4,951,351 A | * | 8/1990 | Eckel | E05F 1/1223 16/284 |
| 5,138,743 A | * | 8/1992 | Hoffman | E05F 1/1223 16/303 |
| 5,367,745 A | * | 11/1994 | Roloff | A47K 3/36 16/312 |
| 5,600,868 A | * | 2/1997 | Tourville | E05F 1/1223 16/277 |
| 6,065,187 A | * | 5/2000 | Mischenko | H04M 1/0216 16/303 |
| 6,467,130 B2 | * | 10/2002 | Kurachi | B60N 3/023 16/418 |
| 7,036,499 B2 | * | 5/2006 | Bartmann | E05B 7/00 126/191 |
| 7,513,014 B2 | * | 4/2009 | Lin | E05D 11/06 16/342 |
| 7,810,214 B2 | * | 10/2010 | Feng | H04M 1/0216 16/305 |
| 8,556,330 B2 | * | 10/2013 | Lazarevich | E05D 7/1005 16/262 |
| 8,677,569 B2 | * | 3/2014 | Ruzich | B60N 3/023 16/412 |
| 8,701,248 B2 | * | 4/2014 | Dries | E05D 5/10 16/280 |
| 8,732,911 B2 | * | 5/2014 | Kajio | B60N 3/023 16/438 |
| 2004/0034964 A1 | | 2/2004 | Loggen et al. | |
| 2004/0189012 A1 | | 9/2004 | Katou et al. | |
| 2005/0022802 A1 | * | 2/2005 | Bartmann | E05B 7/00 126/194 |
| 2006/0119234 A1 | * | 6/2006 | Gu | A47B 95/02 312/236 |
| 2008/0282504 A1 | * | 11/2008 | Baumeister | E05B 7/00 16/412 |
| 2011/0047754 A1 | * | 3/2011 | Takahashi | G06F 1/1681 16/342 |

FOREIGN PATENT DOCUMENTS

| | | |
|---|---|---|
| DE | 102010056437 A1 | 6/2012 |
| EP | 2317229 A1 | 5/2011 |

* cited by examiner

HANDLE FOR AN APPLIANCE OR FURNITURE WITH A HANDLE BAR AND ONE OR TWO ROTATIONAL DEVICES

CROSS-REFERENCE TO RELATED APPLICATIONS

Priority is claimed to German Patent Application No. DE 10 2014 003 663.4, filed on Mar. 14, 2014, the entire disclosure of which is hereby incorporated by reference herein.

FIELD

The present invention relates to a handle for an appliance or furniture, the handle comprising a movable handle bar and one or two rotational devices, the handle bar being attached to a housing or to one or more housings of the one or two rotational devices. The appliance may in particular be a household appliance and/or an electrical appliance, such as, for example, an electric range.

SUMMARY

In an embodiment, the present invention relates to a handle for an appliance or furniture includes a movable handle bar and one or two rotational devices. The handle bar is attached to the housing or to one or more housings of the one or two rotational devices. A shaft of the one or two rotational devices is rotatably supported in the housing. A slide is movably and non-rotatably supported in the housing, and the slide is loaded by a spring and has a guide slot in which a guide pin of the shaft engages.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
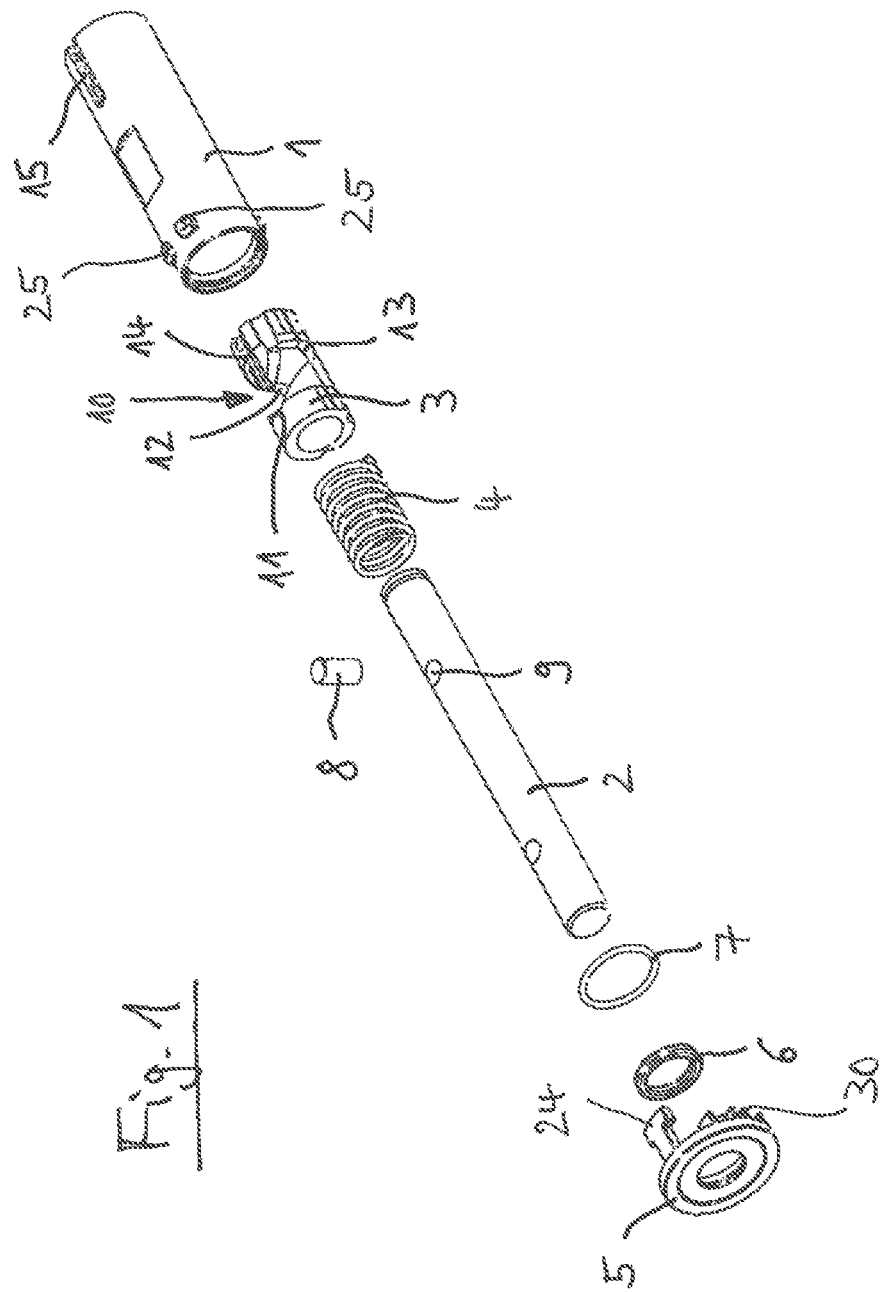
FIG. 1 is a perspective exploded view of a rotational device.

The handle of an embodiment of the present invention includes a handle bar and one or two rotational devices, a housing, a shaft, and a slide. The housing is preferably made of plastic. The shaft is rotatably supported in the housing and is preferably made of metal, in particular steel.

The slide is longitudinally movably and non-rotatably supported in the housing and is loaded by a spring, preferably a compression spring. Moreover, the slide has a guide slot in which engages a guide pin or other guide element of the shaft.

It is advantageous if one or more channels for a damping fluid are provided in the slide and/or in the housing. The channel or channels may be provided on the outer surface of the slide. Instead, or additionally, they may also extend within the slide. Furthermore, the channels may instead or additionally extend on the inner surface of the housing. The interior of the housing is divided by the slide into two chambers. When the slide moves axially, the damping fluid flows through the channel or channels, thereby damping the movement of the slide. The damping fluid may be liquid or pasty, and may in particular take the form of a grease fill.

The rotational device according to the present invention constitutes a component for handles which creates a restoring spring force in response to a rotational movement. After a rotational movement is performed, the rotational device is rotated back to the original position by the spring force. This rotational movement may at the same time be damped. After being rotated, the rotational device will then be rotated back to the original position in a damped manner.

The shaft may be rotatably supported in the housing and/or in a cap connected to the housing. Instead, or additionally, the shaft may be rotatably supported in the slide.

It is advantageous if the guide slot has a middle position and/or one or two end positions. The guide slot is preferably V-shaped. The center of the guide slot then constitutes the middle position, and the two ends of the guide slot constitute the two end positions.

In another advantageous embodiment, the housing has one or more projections on its outer surface. Instead, or additionally, the housing may have one or more grooves on its outer surface. Preferably, two projections and/or two grooves are provided. The projections and/or grooves are preferably located diametrically opposite one another.

In a further advantageous embodiment, the cap has one or more projections. The projections are preferably located diametrically opposite one another.

It is advantageous if the handle includes two rotational devices according to the present invention. However, it is also possible to provide only one rotational device according to the present invention, and to support the other end of the handle bar in a conventional bearing means.

In an advantageous embodiment, the handle bar has a profile that corresponds to the projection or projections and/or to the groove or grooves of the housing. Instead, or additionally, the handle bar has a profile that corresponds to the projection or projections of the cap. In this way, a non-rotational connection can be created between the handle bar, on the on hand, and the housing and/or the cap, on the other hand.

The shaft of the rotational device or devices may in each instance be secured to a respective handle post. The handle post may be attachable or attached to the appliance or furniture.

An exemplary embodiment of the present invention will be described in detail below with reference to the accompanying drawings.

Figure 2:
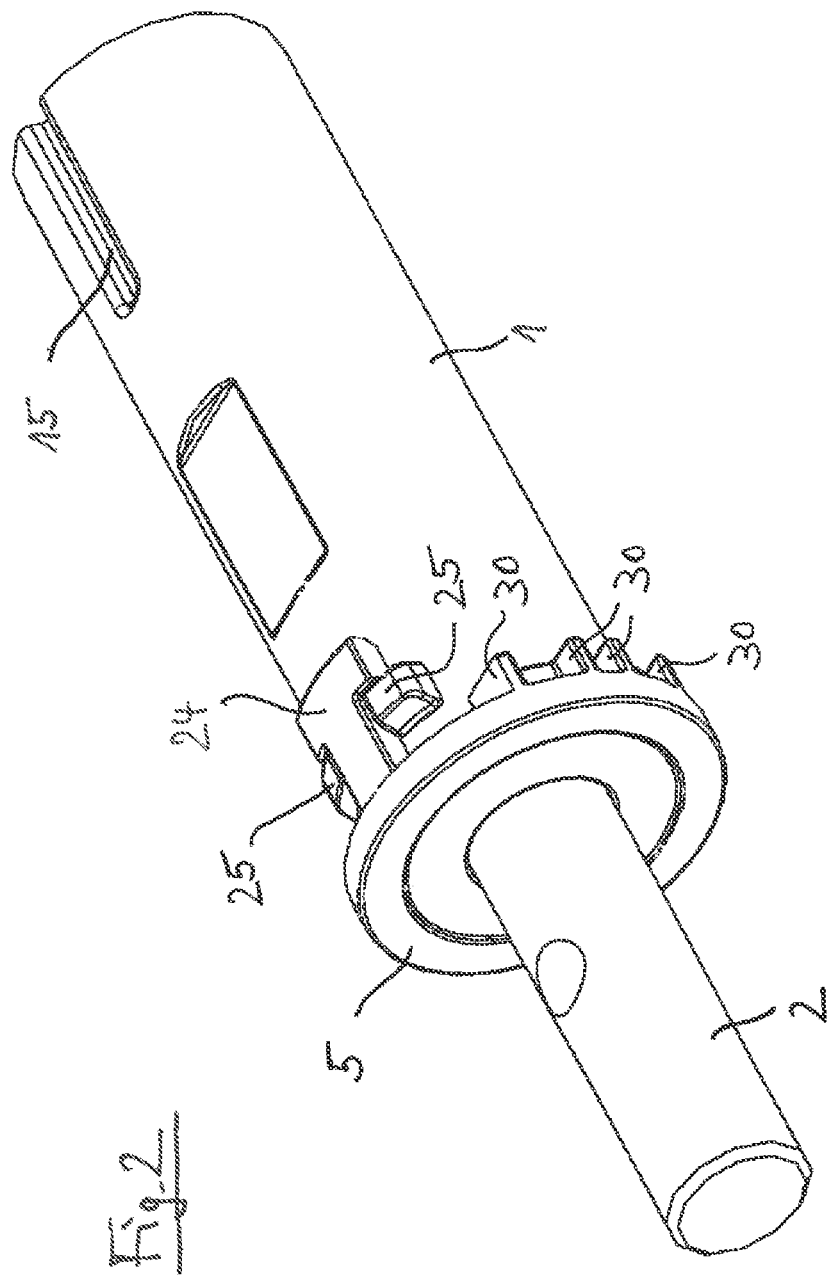
FIG. 2 shows the rotational device of FIG. 1 in an assembled state.

The rotational device shown in FIGS. 1 and 2 includes a housing 1, a shaft 2, a slide 3, a spring 4, and a cap 5. Shaft 2 is rotatably supported in cap 5 and in slide 3. Slide 3 is substantially cylindrical in shape and is longitudinally movably and non-rotatably supported in housing 1. Moreover, slide 3 is loaded by a spring 4. Spring 4 takes the form of a compression spring and is configured as a coil spring. Spring 4 surrounds shaft 2. Spring 4 bears at one end against the inner surface of cap 5 and at its other end against an end face of slide 3. Cap 5 is secured to housing 1 and sealed by sealing rings 6, 7.

Shaft 2 has a guide pin 8 attached thereto. Guide pin 8 is inserted into a corresponding bore 9 of shaft 2. Guide pin 8 may be connected to bore 9 by an interference fit. Instead, or additionally, it may be connected to bore 9 of shaft 2 by adhesive bonding and/or by a threaded connection. Guide pin 8 extends perpendicularly to the longitudinal direction of shaft 2 and projects beyond the outer periphery thereof.

Figure 6:
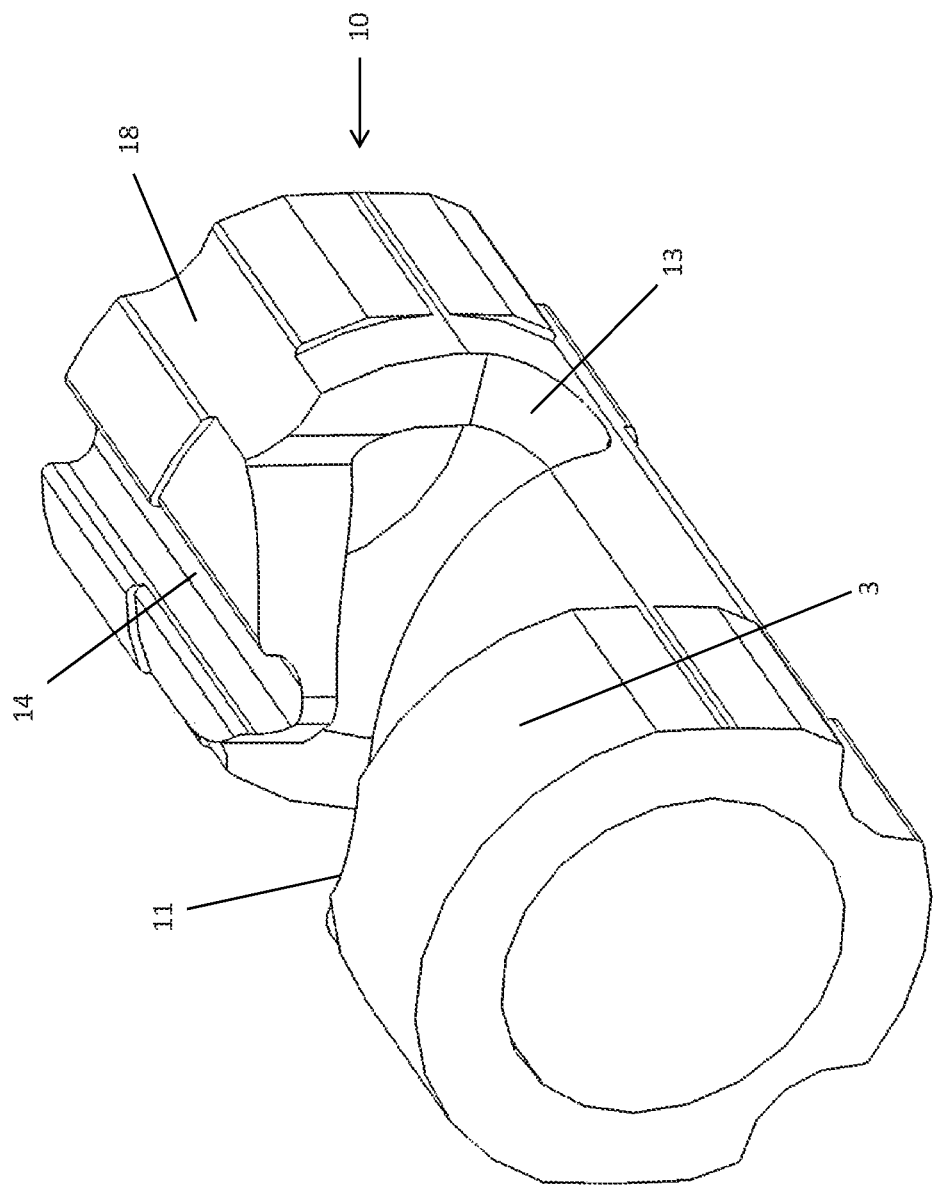
FIG. 6 is an enlarged perspective view of the slide of the rotational device.

Slide 3 has a guide slot 10 provided therein. As can be seen in particular from FIGS. 1 and 6, guide slot 10 is disposed in the outer periphery of slide 3 and is V-shaped. Guide slot 10 has a middle position 11, a first end position 12, and a second end position 13. Middle position 11 is located in the middle of V-shaped guide slot 10. End positions 12, 13 of V-shaped guide slot 10 are located at the ends of V-shaped guide slot 10.

Slide 3 has a guide groove 14 provided therein. Guide groove 14 is formed in the outer periphery of slide 3 and extends in the longitudinal direction thereof. Guide groove 14 begins at middle position 11 of V-shaped guide slot 10 and extends to the end of slide 3. Housing 1 has a corresponding guide projection 15 provided therein. Guide projection 15 is located at the end of housing 1 opposite cap 5 and is directed inwardly. Guide projection 15 extends in a straight line. Its cross section corresponds substantially to that of guide groove 14. Guide projection 15 engages guide groove 14. The cooperation of guide groove 14 and guide projection 15 ensures that slide 3 is longitudinally movably and non-rotatably supported in housing 1.

Slide 3 has a further guide groove 16 provided therein which is offset by 180° from guide groove 14. Apart from that, the further guide groove 16 is configured identically to guide groove 14. Correspondingly, housing 1 has a further guide projection 17 provided therein which is offset by 180° from guide projection 15 and, apart from that, is configured identically to guide projection 15.

Slide 3 has channels 18 provided therein for a damping fluid. Channels 18 are formed in the outer surface of slide 3 and extend in the longitudinal direction thereof.

Figure 3:
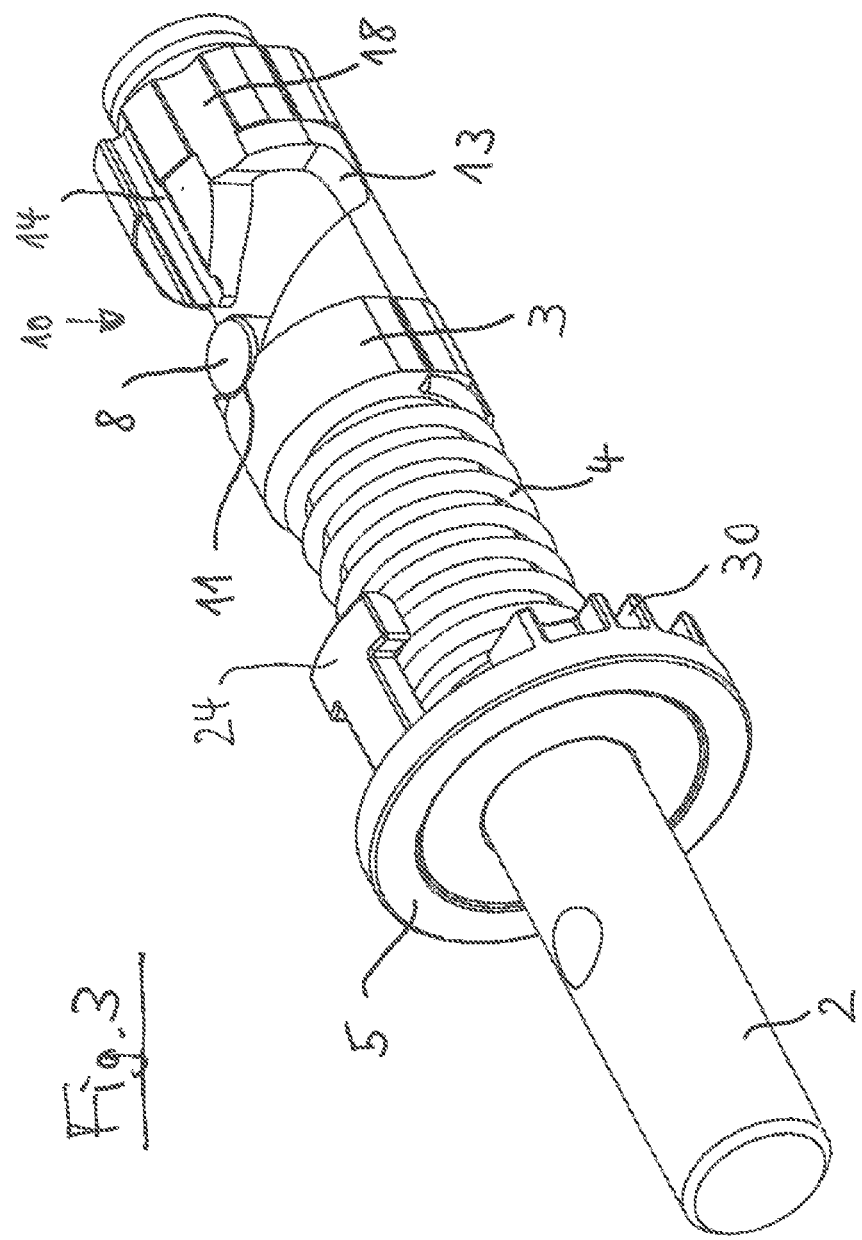
FIG. 3 shows the rotational device of FIGS. 1 and 2 without the housing in the middle position.
Figure 7:
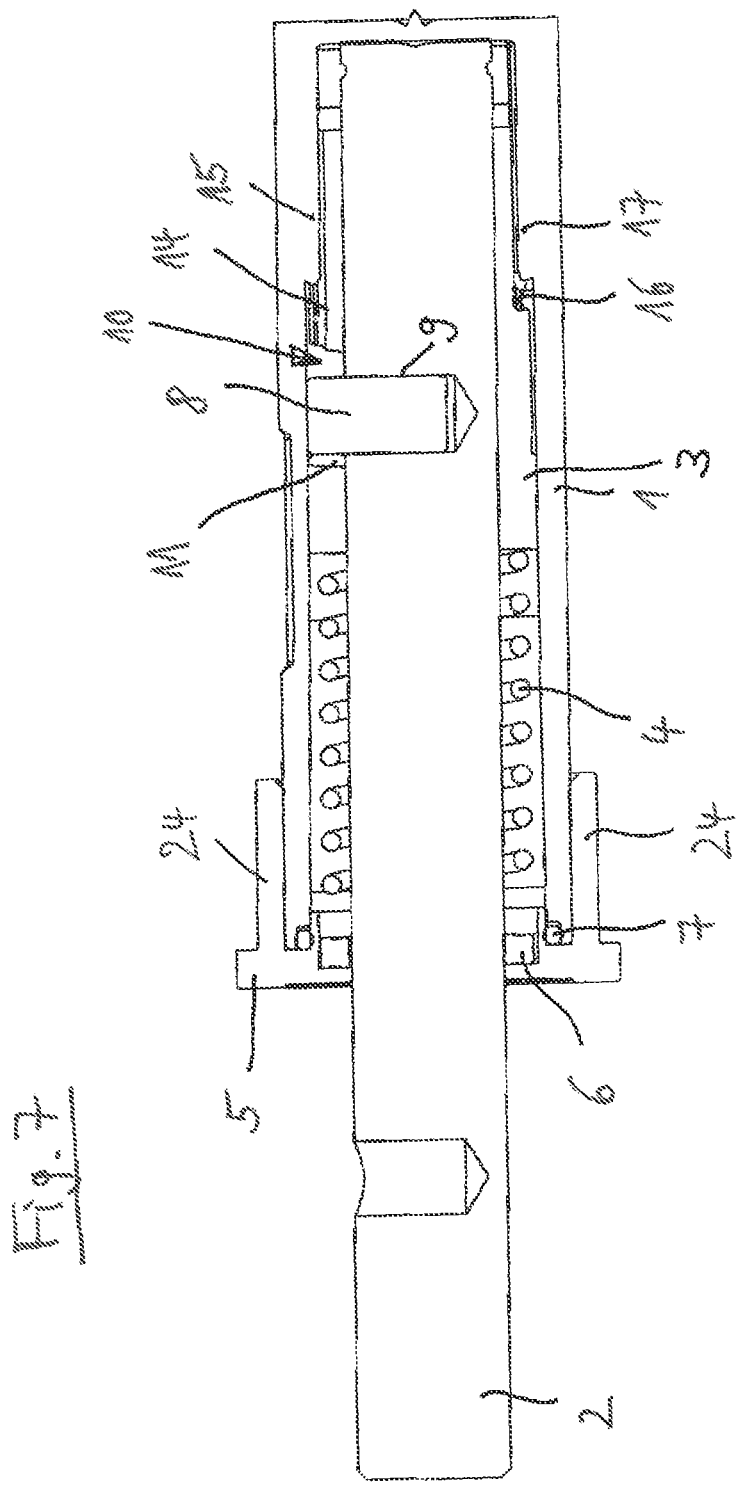
FIG. 7 is a longitudinal sectional view showing the rotational device in the middle position.
Figure 8:
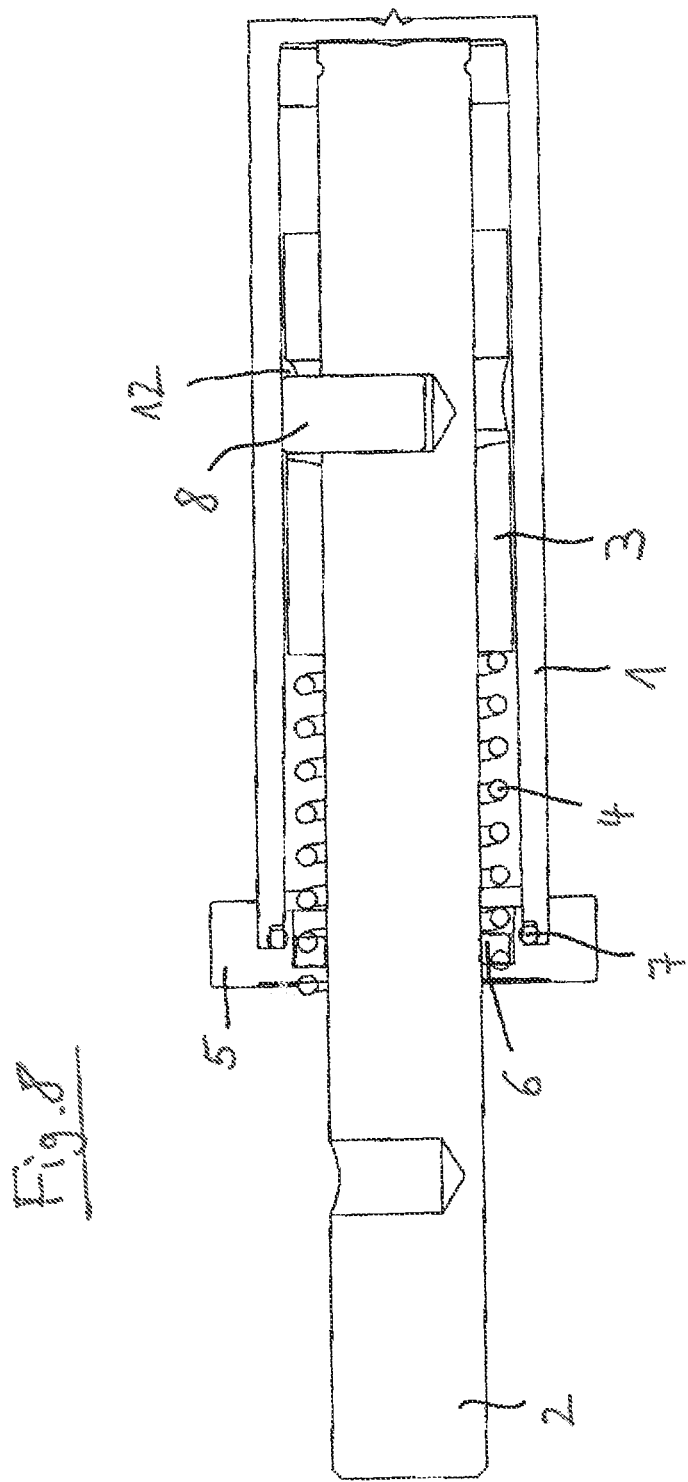
FIG. 8 is a longitudinal sectional view showing the rotational device in an end position.
Figure 9:
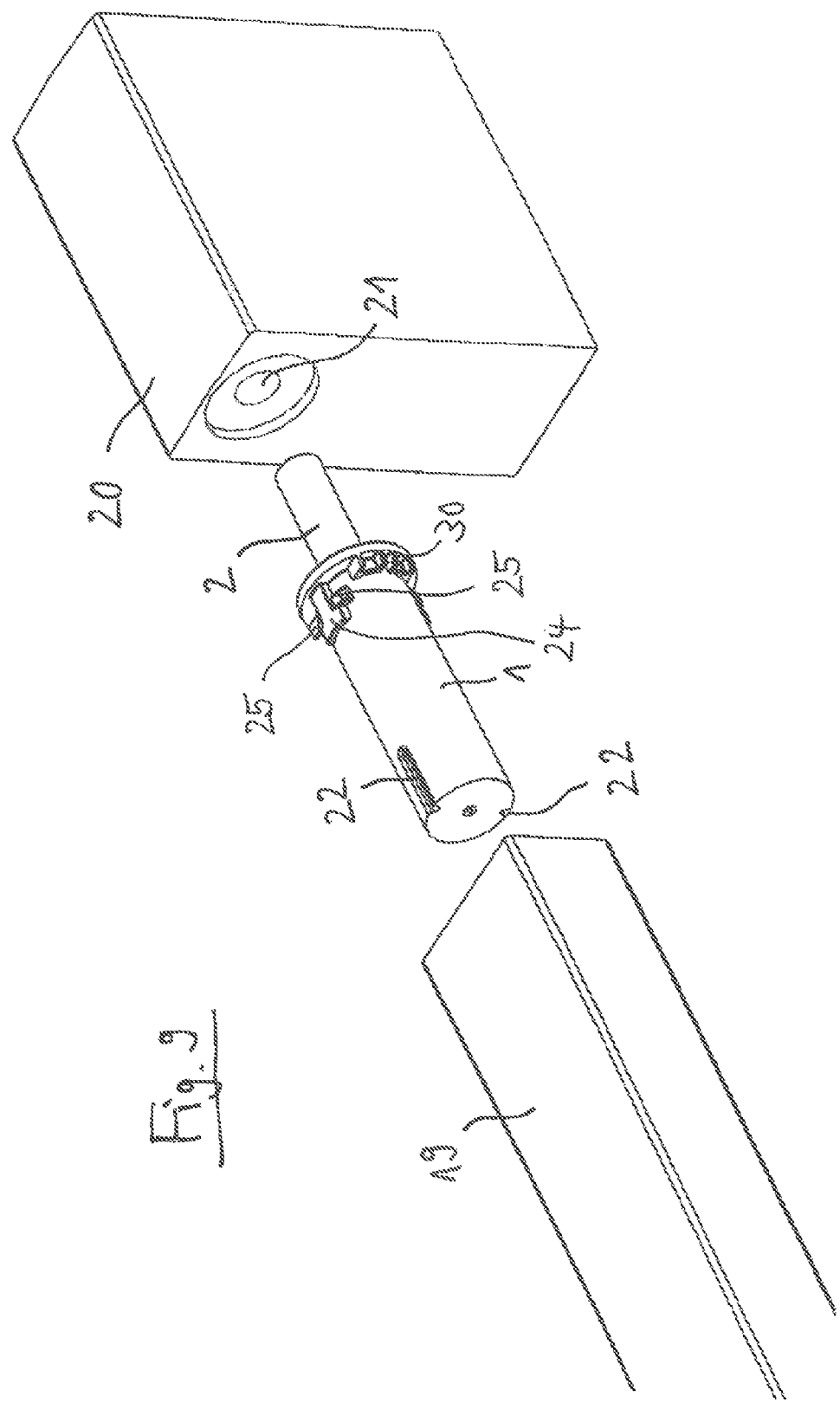
FIG. 9 shows a portion of a handle including a handle bar, a rotational device, and a handle post.
Figure 10:
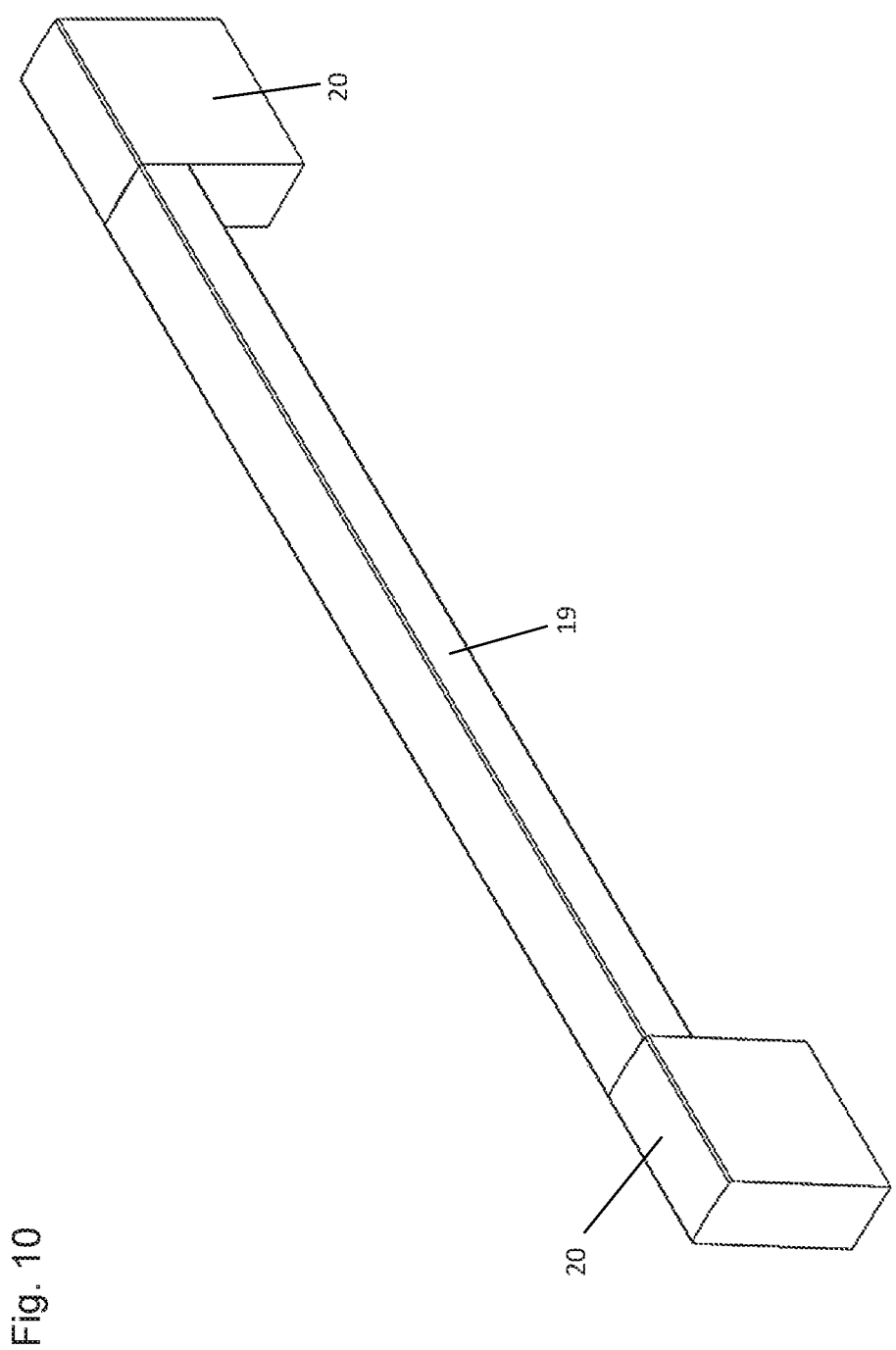
FIG. 10 shows the handle of FIG. 9 in an assembled state in the middle position.

During operation, the rotational device is initially in the position shown in FIGS. 3, 7 and 10. In this position, guide pin 8 of shaft 2 contacts middle position 11 of guide slot 10. Middle position 11 is located at the apex of V-shaped guide slot 10. Spring 4, which is configured as a compression spring, pushes slide 3 toward guide pin 8, so that guide pin 8 reliably contacts the middle position of guide slot 10.

Figure 4:
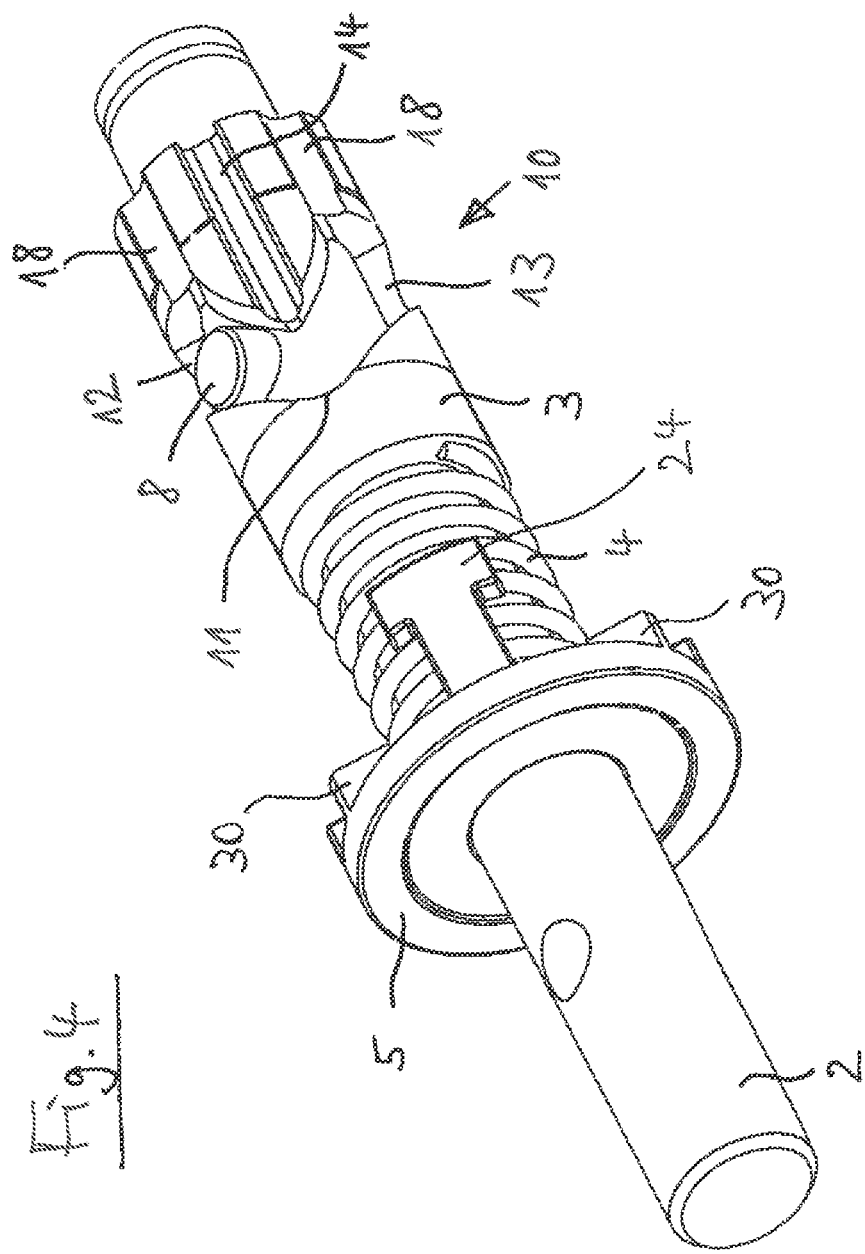
FIG. 4 is a view corresponding to FIG. 3, showing the rotational device after a partial rotation.

When housing 1 is rotated relative to shaft 2, then the position shown in FIG. 4 is reached. During this rotation, housing 1 carries with it the slide 3, which is rotated along with housing 1 due to the connections between guide projections 15, 17 and guide grooves 14, 16. In this process, pin 8 runs along a flank of V-shaped guide slot 10 of slide 3. Since this flank is inclined relative to the longitudinal direction of shaft 2 and slide 3, slide 3 is moved toward cap 5 of housing 1. The distance between slide 3 and cap 5 is decreased, so that spring 4 is compressed.

Figure 5:
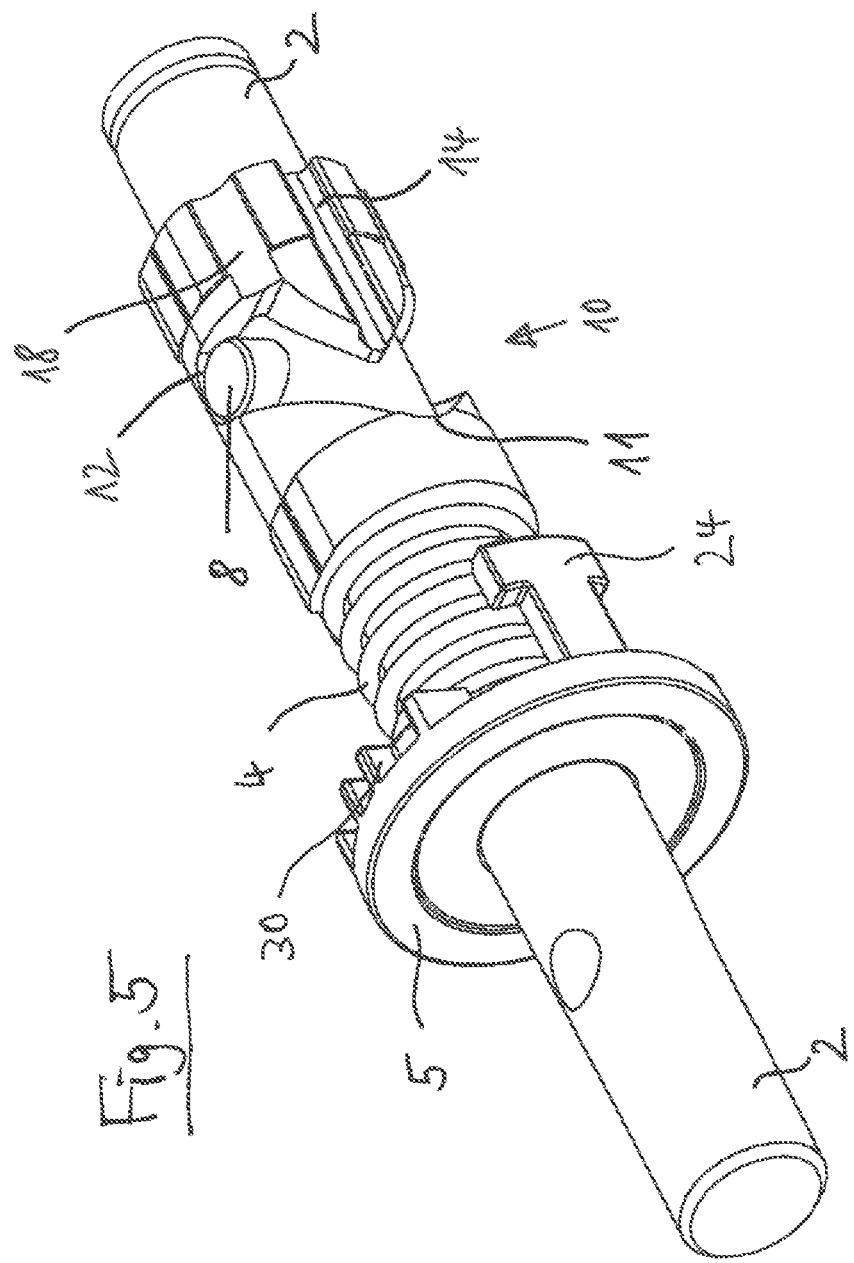
FIG. 5 is a view corresponding to FIGS. 3 and 4, showing the rotational device in an end position.

When housing 1 is rotated further relative to shaft 2, then the end position shown in FIG. 5 is reached. In this position, guide pin 8 contacts the first end position 12 of V-shaped guide slot 10. First end position 12 is provided by the end of the corresponding leg of V-shaped guide slot 10. Spring 4 is maximally compressed.

When housing 1 is then released, spring 4, which is configured as a compression spring, exerts a force on slide 3, which force is directed away from cap 5 of housing 1. Since the leg of V-shaped guide slot 10 extends at an angle relative to the longitudinal direction of slide 3, slide 3 is thereby rotated relative to shaft 2. Via guide grooves 14, 15 and guide projections 15, 17, housing 1 is rotated to the same extent as slide 3. Ultimately, therefore, the force of spring 4 rotates slide 3 back, and with it housing 1. Slide 3, together with housing 1, performs the initial deflection movement in the opposite direction. The non-deflected original position shown in FIG. 3, in which guide pin 8 is located in middle position 11 of V-shaped guide slot 10, is reached via the intermediate position shown in FIG. 4.

In this process, the movement of slide 3 is damped. Slide 3 divides the interior of housing 1 into two chambers. The first chamber is formed by the annular region that is located between shaft 2 and housing 1 and in which spring 4 lies. The second chamber is formed by the interior region of housing 1 that is located on the opposite side of slide 3. Both chambers contain a grease fill. When slide 3 moves axially due to the action of guide pin 8 along guide slot 10, the volume of one chamber is reduced, and the volume of the other chamber is increased. To achieve compensation, the grease fill flows through channels 18, thereby damping the movement of slide 3, and with it that of housing 1.

The handle for an appliance, as shown in FIGS. 9-13, includes two rotational devices, a handle bar 19, and two handle posts 20. Handle posts 20 may be attached to the appliance, in particular to a range door. Handle posts 20 may be screwed and/or adhesively bonded to the appliance.

Each handle post 20 has an opening 21 formed therein into which may be fitted the shaft 2 of a rotational device. Shaft 2 is connected to handle post 20 in fixed relationship therewith, both in the axial direction and in the direction of rotation. Openings 21 of handle posts 20 face and are aligned with one another.

Handle bar 19 is connected to a housing 1 of a rotational device at each of its ends. To transmit the rotational movement of handle bar 19 to housings 1 of the rotational devices, each housing 1 is provided with two guide grooves 22.

Guide grooves 22 are located on the ends of housings 1 that face away from shafts 2 and caps 5, and are in each instance offset by 180° from one another. Guide grooves 22 are formed by the outer surfaces of guide projections 15, 17 and extend in the longitudinal direction of housings 1. Guide grooves 22 each begin at the respective end of housing 1 opposite cap 5. Handle bar 19 has corresponding guide projections formed therein (not shown in the drawings) which engage guide grooves 22.

Figure 14:
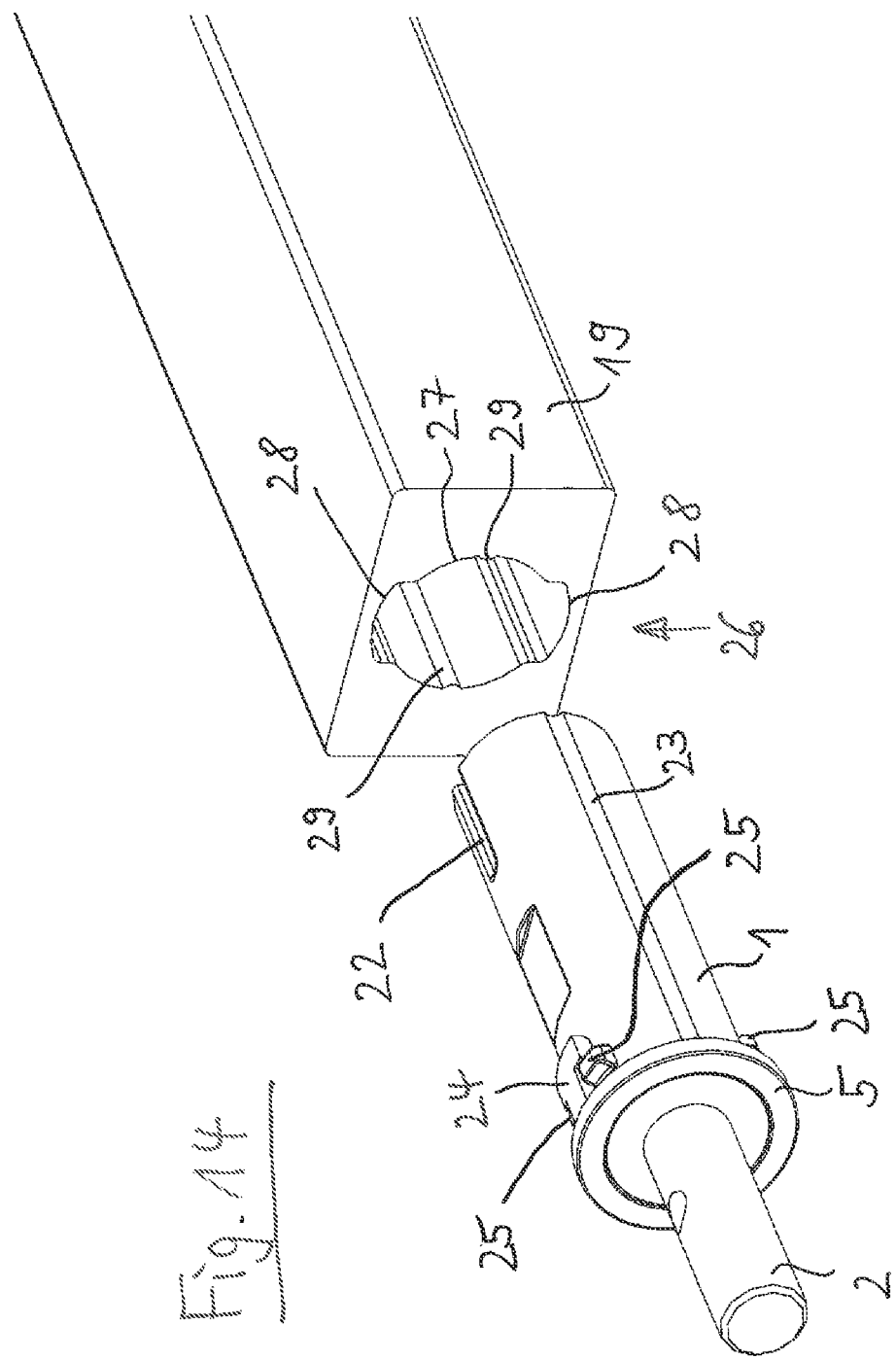
FIG. 14 is a perspective view showing a rotational device and a portion of a handle bar in a non-assembled state.
Figure 15:
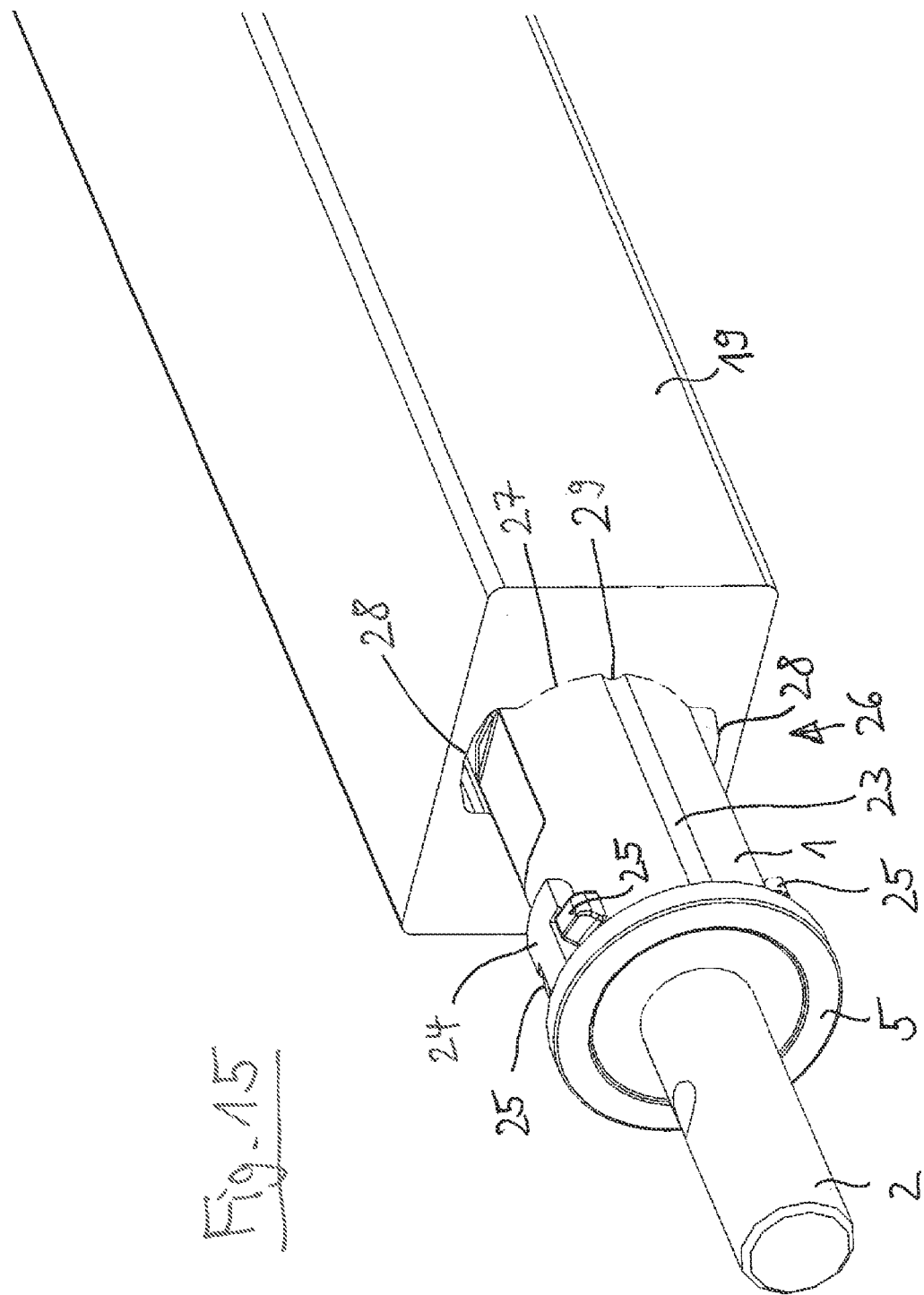
FIG. 15 shows the rotational device and the handle bar of FIG. 14 in a partially assembled state.

FIGS. 14 and 15 show a modified embodiment of the rotational device. Here, housing 1 has two grooves 23. Grooves 23 are configured as indentations extending in the longitudinal direction of housing 1. Grooves 23 are incorporated into the outer curved surface of housing 1 and are located diametrically opposite one another. In FIGS. 14 and 15, only one of grooves 23 is shown.

As in the other embodiments, cap 5 has a T-shaped projection 24 extending from the rim of cap 5 toward housing 1. T-shaped projection 24 extends parallel to the curved surface of housing 1 and is in contact therewith. T-shaped projection 24 is curved in the same manner as the outer curved surface of housing 1.

Housing 1 has two projections 25 pointing outward from the outer curved surface of housing 1. Projections 25 are located at the end of housing 1 facing cap 5. In the assembled position, projections 25 are located between cap 5 and T-shaped projection 24 by which they are embraced.

Handle bar 19 has a profile 26 formed by an opening in handle bar 19. Profile 26 is located at the end of handle bar 19 facing housing 1 and has a depth at least equal to the length of housing 1. However, profile 26 may also be a configured to extend from end to end.

Contour 27 of profile 26 is configured such that it enables a non-rotational connection between housing 1 and handle bar 19. To this end, contour 27 has a bulge 28 which receives T-shaped projection 24 and projections 25. Furthermore, contour 27 has two inwardly directed ribs 29 whose shape corresponds to groove 23. In the assembled state, grooves 23 are located in the region of ribs 29.

Figure 16:
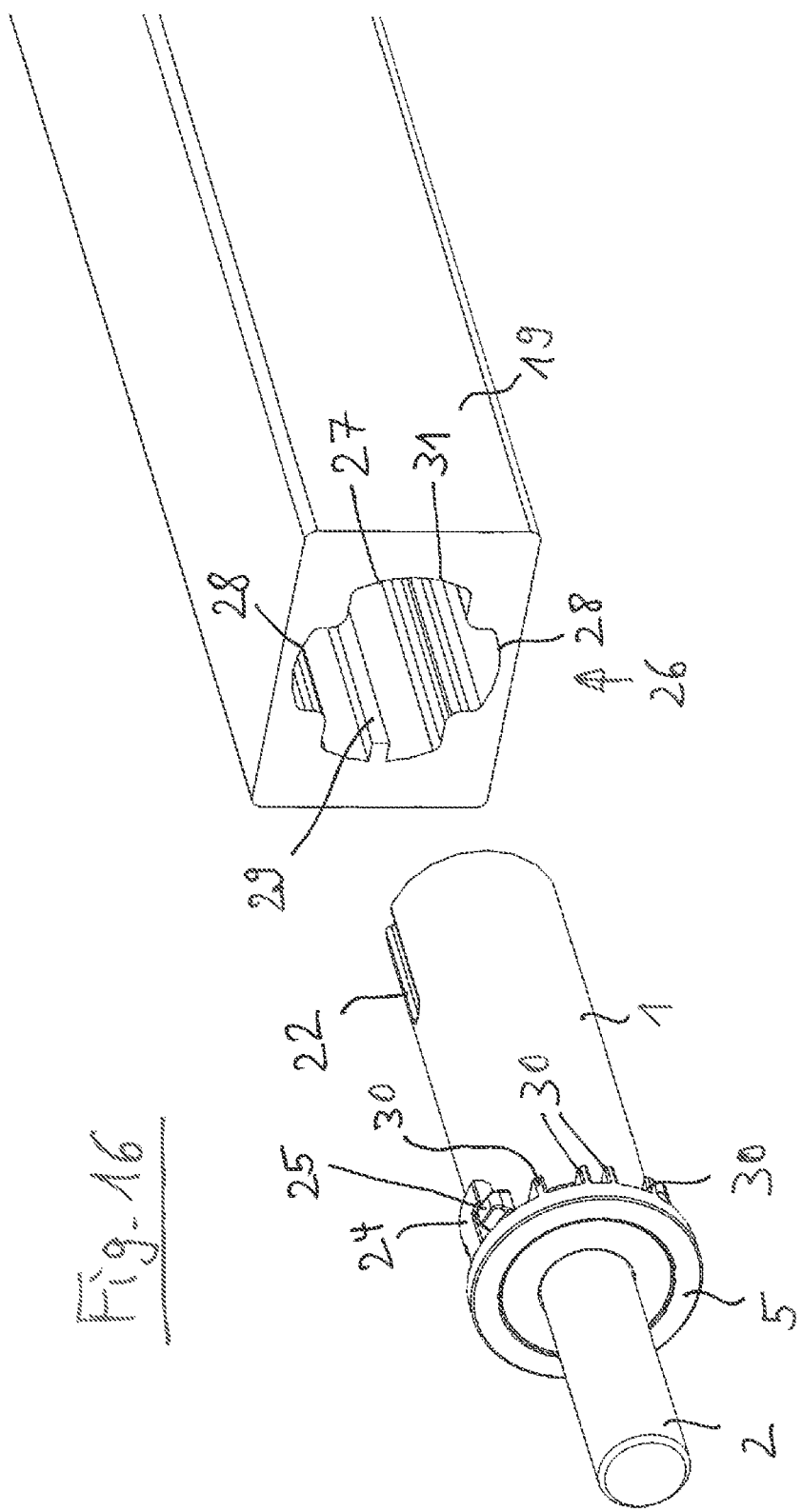
FIG. 16 is a perspective view showing a modified embodiment of a rotational device and a handle bar in a non-assembled state.
Figure 17:
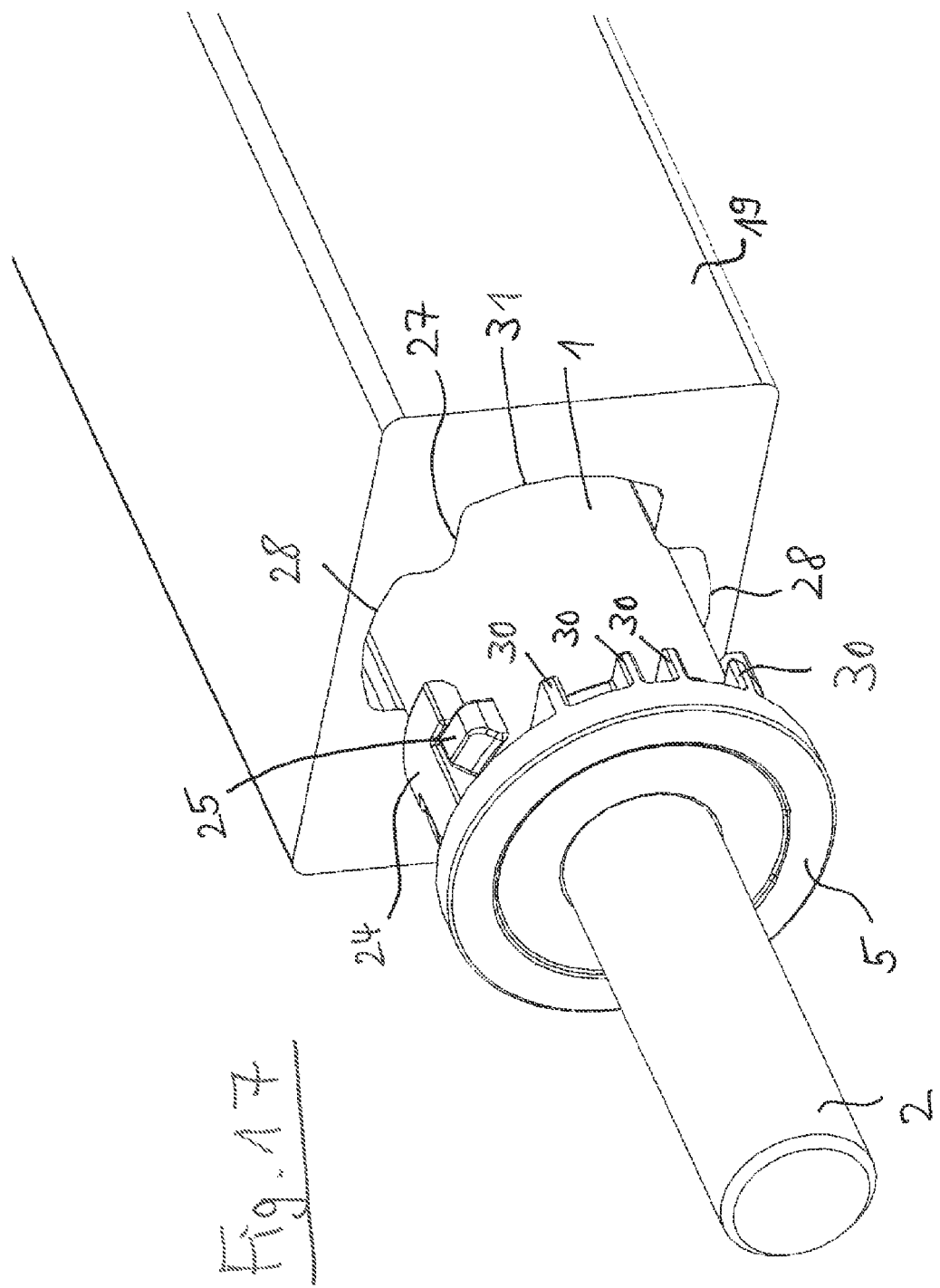
FIG. 17 shows the rotational device and the handle bar of FIG. 16 in a partially assembled state.
Figure 18:
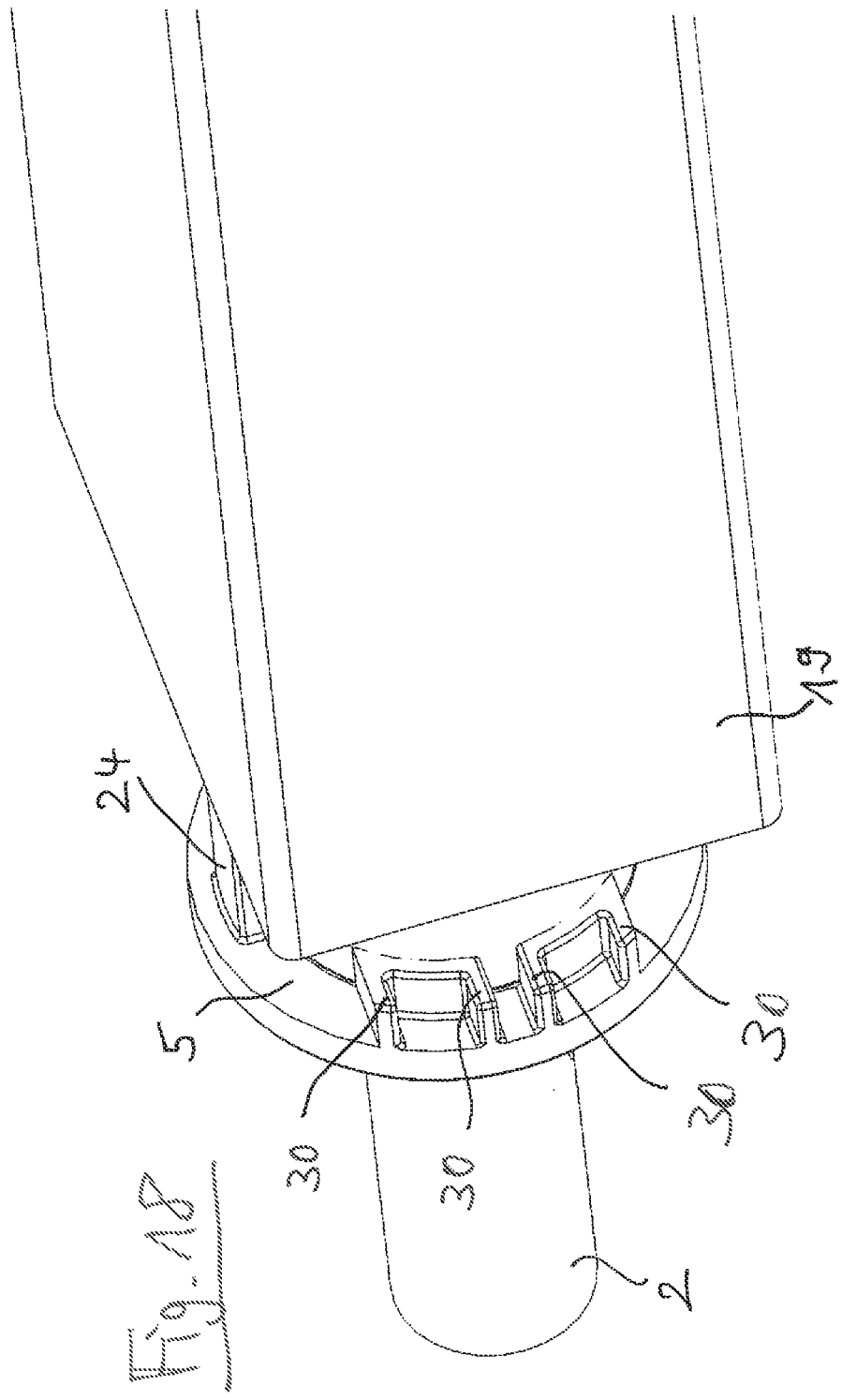
FIG. 18 is a view of the subject matter of FIG. 17 from the rear.
Figure 19:
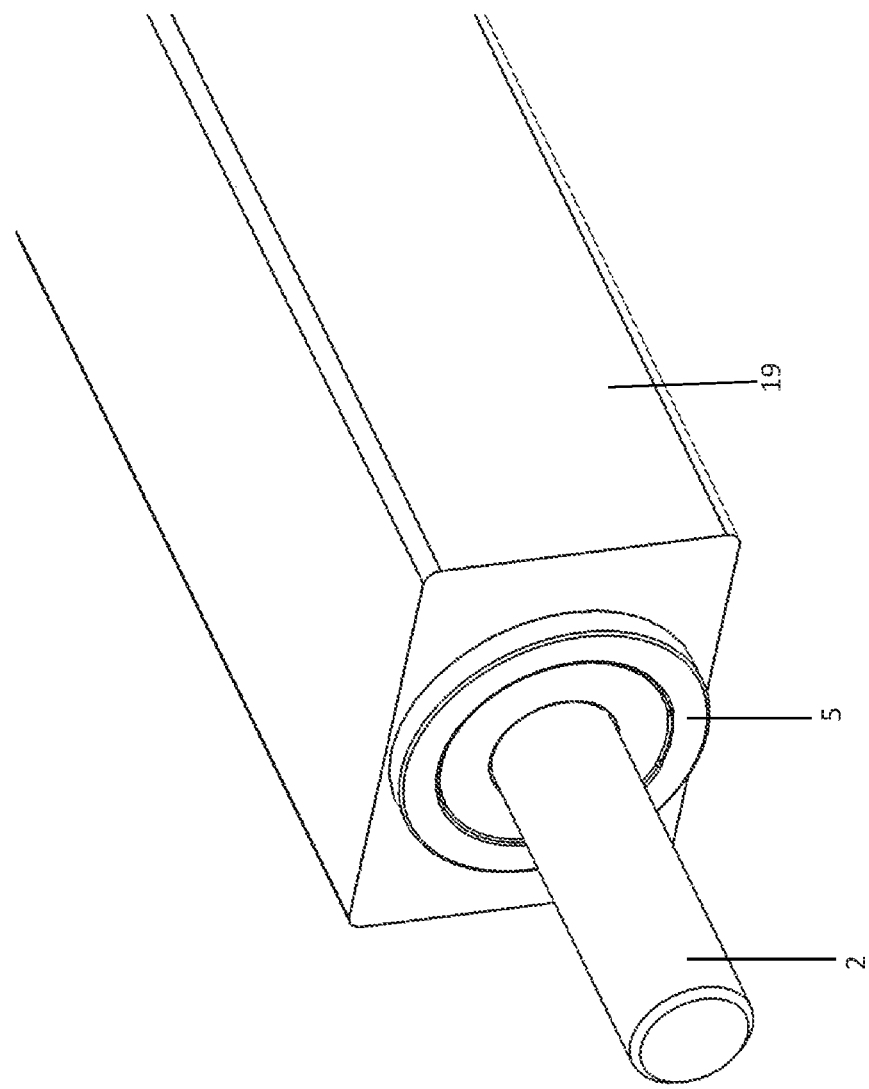
FIG. 19 shows the subject matter of FIGS. 14 through 18 in a fully assembled state.

In the embodiment of FIGS. 16 and 17, like parts are identified by the same reference numerals, so that they do not need to be described again. Here, cap 5 has projections 30. On the opposite side of cap 5, further projections are provided (not visible in FIGS. 17 and 18). Contour 27 of profile 26 of handle bar 19 has bulges 31 whose shape corresponds to projections 30. In the assembled state, projections 30 are located within bulges 31.

During operation, handle bar 19 initially assumes the middle position shown in FIG. 10, in which slide 3 and housing 1 are not deflected. In this position, guide pin 8 contacts middle position 11 of guide slot 10 of slide 3.

Figure 11:
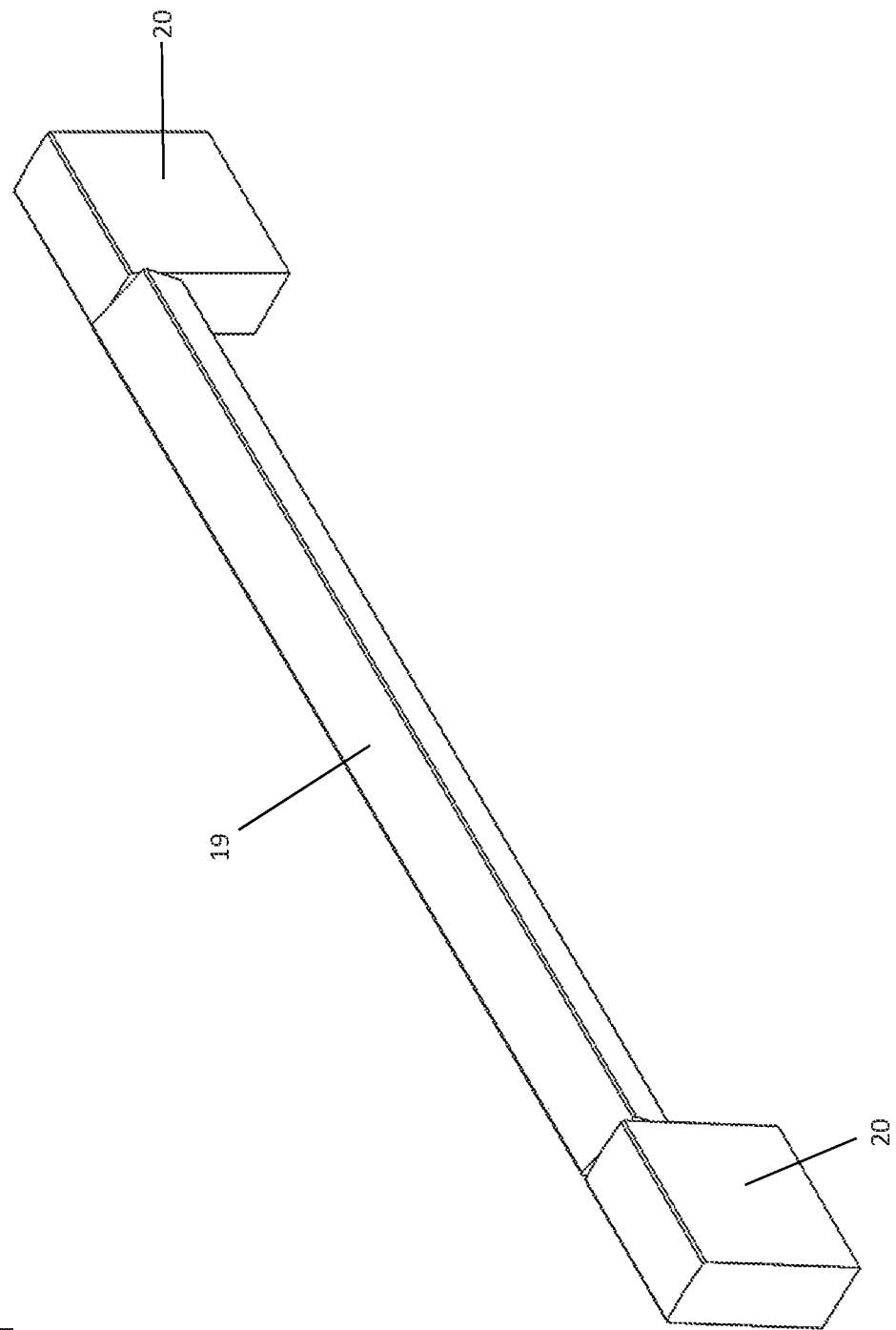
FIG. 11 is a view showing the handle with the handle bar in a partially deflected position.
Figure 12:
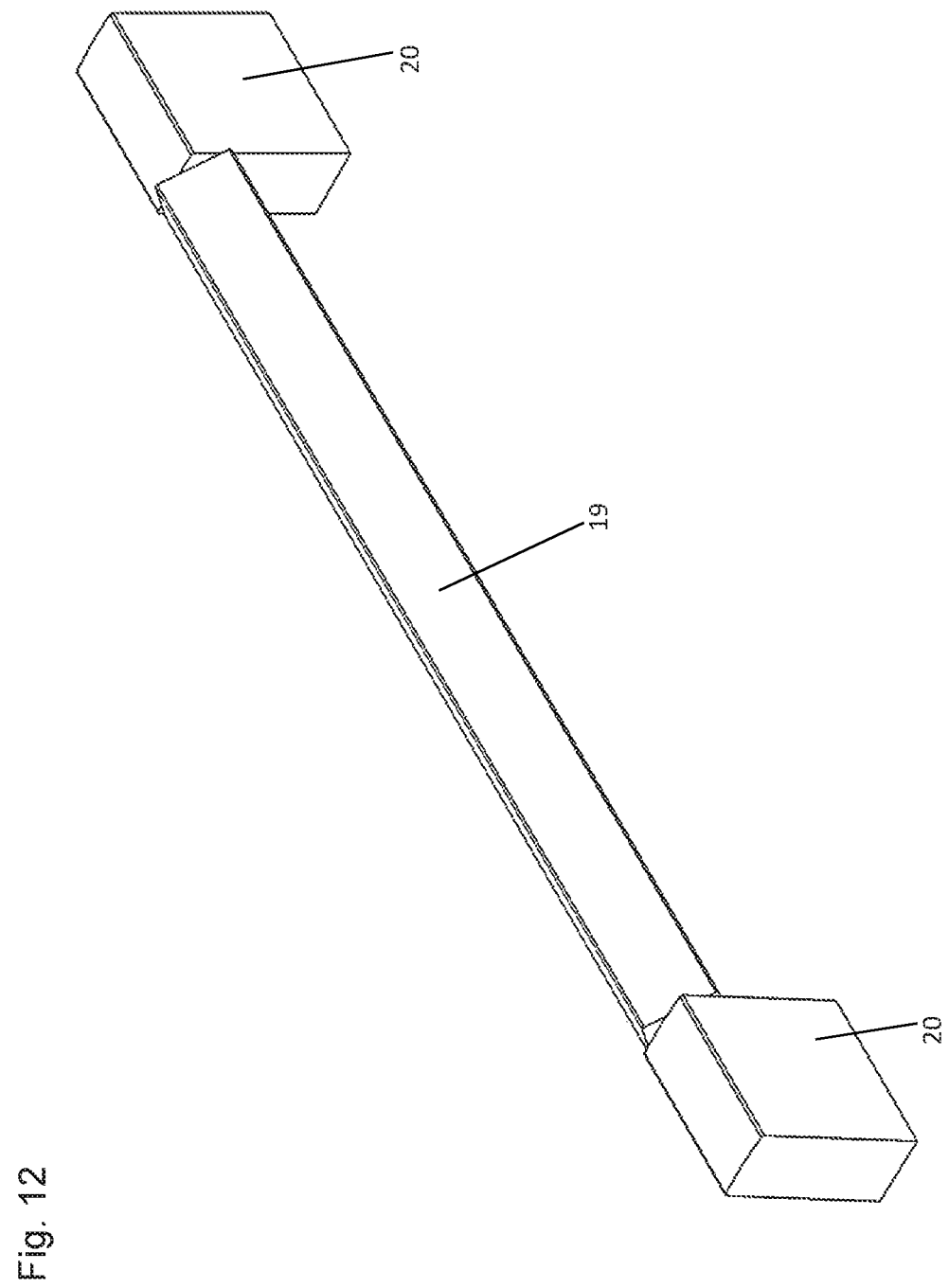
FIG. 12 is a view showing the handle with the handle bar in a nearly fully deflected position.
Figure 13:
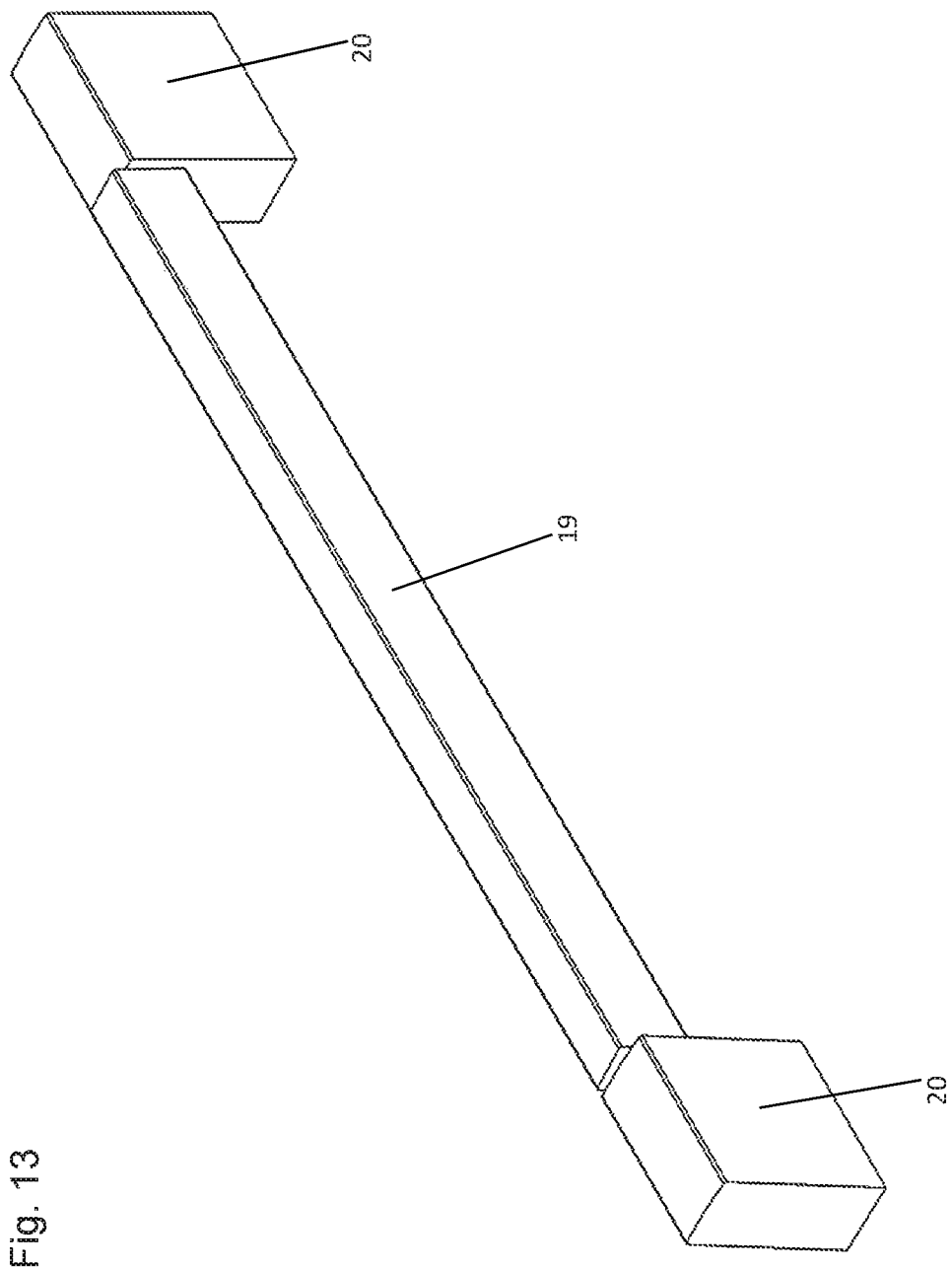
FIG. 13 is a view showing the handle with the handle bar in a fully deflected position.

When handle bar 19 is rotated, it successively assumes the positions shown in FIGS. 11 and 12 until the fully deflected position shown in FIG. 13 is reached. In this position, guide pin 8 contacts the first end position 12 of guide slot 10.

When handle bar 19 is then released, it automatically passes through the aforementioned positions in reverse order. Accordingly, handle bar 19 is first rotated back to the nearly fully deflected position shown in FIG. 12, then to the partially deflected position shown in FIG. 11, and subsequently to the normal position shown in FIG. 10. This is achieved by the force of the compression-type spring 4 which acts on slide 3, rotating it back along with housing 1 and handle bar 19.

The rotational movement of handle bar 19 is damped in both directions. Damping is created by the grease fill in housing 1, which flows through channels 18 of slide 3 during movement thereof.

The present invention provides a component which may be used for control elements, such as handles, or similar movable parts. This component is capable of both producing a rotational movement by spring force while also damping this rotational movement. The present invention may be used for a handle hose handle bar can be rotated. Handle bar 19 can be rotated in two directions by about 90°, respectively, and can then automatically return to the original position in a damped manner.

As shown in the exemplary embodiment, the force of spring 4 is converted into a rotational movement via guide slot 10 in slide 3 and a guide pin 8 inserted into shaft 2. The contour of guide slot 10 defines the variation in torque over the rotational movement. At the same time, slot 10 can define a defined middle position 11 and end positions 12, 13. Slide 3 runs in a housing 1 containing a grease fill and separates it into two chambers. When slide 3 moves, the grease is forced through channels 18 in slide 3, and possibly also in the housing, from one chamber into the other, thereby damping the movement. The grease fill serves for both lubrication and damping purposes.

Slide 3 is guided in housing 1 and can only move in the axial direction. Shaft 2 is machined to include a bore 9 for guide pin 8, as well as a bore, a milled cutout, or the like, for securing the shaft to a mating part, for example, to handle post 20.

Spring 4, slide 3, housing 1 and cap 5 may be assembled to form a complete rotational device, which in turn may be incorporated into another assembly, such as a handle. The adjustment of the torque is accomplished via the hardness and/or the bias of spring 4, which is configured, in particular, as a compression spring, and via the geometry of guide slot 10. The adjustment of the damping is accomplished via the viscosity and amount of the grease or other damping fluid and via the geometry of channels 18.

In the case of the handle of FIGS. 9-13, the rotational devices may be preassembled and inserted into handle posts 20 and handle bar 19 during the final assembly of the handle. In the event of repair, they may also be replaced as units. A rugged unit formed by steel shaft 2 and plastic housing 1 enables high forces to be transmitted from handle bar 19 to handle posts 20, and thus to the front of the appliance or furniture. The handle may alternatively also be provided with only one rotational device. The connection to second handle post 20 may then be configured as a simple bearing means.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A handle for an appliance or furniture, the handle comprising:
   a movable handle bar having a profile formed by an opening in the movable handle bar, the profile having a contour with a bulge; and
   a first rotational device, the first rotational device comprising:
      a first housing attached to the movable handle bar, the first housing having one or more projections on an outer surface of the first housing;
      a first shaft rotatably supported in the first housing, the first shaft including a first bore in which a first guide pin is fixedly and non-rotatably disposed; and
      a first slide movably and non-rotatably supported in the first housing, the first slide being loaded by a first spring and having a first guide slot, wherein the first guide pin non-rotatably projects from a surface of the first shaft and into the first guide slot; and
      a cap connected to the first housing or in the first slide and in which the first shaft is rotatably supported, the cap having at least one projection,
   wherein in an assembled state, the one or more projections on the outer surface of the first housing and the at least one projection of the cap are received in the bulge.

2. The handle as recited in claim 1, further comprising at least one channel containing a damping fluid.

3. The handle as recited in claim 1, wherein the first guide slot has a middle position and two end positions.

4. The handle as recited in claim 1, wherein the profile of the movable handle bar corresponds to the one or more projections on the outer surface of the first housing.

5. The handle as recited in claim 1, wherein the first shaft of the first rotational device is secured to a first handle post.

6. The handle as recited in claim 1, wherein the profile of the movable handle bar corresponds to the at least one projection of the cap.

7. The handle as recited in claim 1, wherein the first housing has one or more grooves on an outer surface of the first housing.

8. The handle as recited in claim 7, wherein the profile of the movable handle bar corresponds to the one or more grooves of the first housing.

9. The handle as recited in claim 1, further comprising a second rotational device, the second rotational device comprising:
   a second housing attached to the movable handle bar;
   a second shaft rotatably supported in the second housing, the second shaft including a second bore in which a second guide pin is fixedly and non-rotatably disposed; and
   a second slide movably and non-rotatably supported in the second housing, the second slide being loaded by a second spring and having a second guide slot, wherein the second guide pin non-rotatably projects from a surface of the second shaft and into the second guide slot.

10. The handle as recited in claim 9, wherein the second shaft of the second rotational device is secured to a second handle post.

11. The handle as recited in claim 1, wherein the at least one projection of the cap is T-shaped.

12. The handle as recited in claim 1, wherein the one or more projections on the outer surface of the first housing comprises at least two projections, and the at least one projection of the cap is disposed between the at least two projections on the outer surface of the first housing.

* * * * *